United States Patent
Gleason

(10) Patent No.: US 11,341,477 B2
(45) Date of Patent: May 24, 2022

(54) METHODS AND SYSTEMS FOR GENERATING GRAPHICAL USER INTERFACES FOR ELECTRONIC COMMUNICATION BETWEEN USERS, PROVIDER, AND PAYERS

(71) Applicant: Eligible, Inc., Brooklyn, NY (US)

(72) Inventor: Katelyn Gleason, New York City, NY (US)

(73) Assignee: Eligible, Inc., Brooklyn, NY (US)

( * ) Notice: Subject to any disclaimer, the term of this patent is extended or adjusted under 35 U.S.C. 154(b) by 251 days.

(21) Appl. No.: 16/701,639

(22) Filed: Dec. 3, 2019

(65) Prior Publication Data
US 2020/0184453 A1 Jun. 11, 2020

Related U.S. Application Data

(60) Provisional application No. 62/776,984, filed on Dec. 7, 2018.

(51) Int. Cl.
| | |
|---|---|
| *G06Q 40/00* | (2012.01) |
| *G06Q 20/32* | (2012.01) |
| *G06F 3/0482* | (2013.01) |
| *H04L 65/403* | (2022.01) |
| *H04L 67/02* | (2022.01) |
| *H04L 67/53* | (2022.01) |

(Continued)

(52) U.S. Cl.
CPC ......... *G06Q 20/325* (2013.01); *G06F 3/0482* (2013.01); *G06Q 20/047* (2020.05); *H04L 65/1069* (2013.01); *H04L 65/403* (2013.01); *H04L 67/02* (2013.01); *H04L 67/20* (2013.01); *G06F 17/18* (2013.01)

(58) Field of Classification Search
USPC .... 705/4, 3, 5, 38, 40, 37, 36; 235/378, 379
See application file for complete search history.

(56) References Cited

U.S. PATENT DOCUMENTS

| | | | |
|---|---|---|---|
| 2009/0106197 A1* | 4/2009 | Bennett, III | G06Q 30/02 |
| 2011/0066445 A1* | 3/2011 | Klain | G06Q 40/08 |
| | | | 709/204 |

(Continued)

OTHER PUBLICATIONS

Secure Communication for Internet Payment in Heterogeneous Networks; 2010 24th IEEE International Conference on Advanced Information Networking and Applications (pp. 1085-1092); Abdellaoui, R. Pasquet, M.; Apr. 20, 2010 . . . (Year: 2010).*

*Primary Examiner* — Tien C Nguyen
(74) *Attorney, Agent, or Firm* — Cognition IP, P.C.; Edward Steakley; Saleh Kaihani

(57) ABSTRACT

A system and method for generating a graphical user interface for establishing multiparty electronic communication include generating, for interaction with a user, a dashboard for electronic resolution of a claim for a payer portion of a cost of an item. The method also includes calculating, in response to a selection in the dashboard, an estimated user portion of the cost of the item. Further, the method includes establishing a network interface for network communication between a provider of the item and the payer. Additionally, the method includes coordinating, via the network interface, the resolution of the payer portion of the cost of the item. The method also includes updating, in real-time, the dashboard with a status of the resolution of the payer portion of the cost.

20 Claims, 19 Drawing Sheets

(51) Int. Cl.
*H04L 65/1069* (2022.01)
*G06Q 20/04* (2012.01)
*G06F 17/18* (2006.01)

(56) References Cited

U.S. PATENT DOCUMENTS

| | | | |
|---|---|---|---|
| 2016/0232296 A1* | 8/2016 | Cohen | G16H 30/20 |
| 2017/0068952 A1* | 3/2017 | Brockmann | G06Q 20/4014 |
| 2018/0068392 A1* | 3/2018 | Bowes | G06Q 40/08 |
| 2018/0278462 A1* | 9/2018 | Bjontegard | A63F 13/213 |
| 2019/0104201 A1* | 4/2019 | Bati | H04L 65/4084 |
| 2021/0049530 A1* | 2/2021 | Anderson | G06F 9/451 |

* cited by examiner

500

| Eligible Pay | Good afternoon, Jane Doe<br>Your Account Balance is $0.00    506 |
|---|---|
| Summary<br><br>Activity<br><br>Wallet<br><br>Help<br><br><br><br><br><br><br><br>My Account | RAPID CLINIC<br><br>Wellness Checkup |

Calculate your Estimate

Congratulations! Below is your cost estimate based on the coverage information provided An additional policy was found How was this calculated?

Policy

Medicare

Payable Amount $50.00

Eligible Pay

| Eligible Pay | Good afternoon, Jane Doe<br>Your Account Balance is $0.00  516 | |
|---|---|---|
| Summary | Wellness Checkup  $50.00 | Payment method |
| Activity | | Visa Debit  ****1111 |
| | Status | Medicare  ****5555 |
| Wallet | | |
| Help | Processing by Rapid Clinic | Distribution of Payments |
| | | Visa Debit: $50.00 |
| | | Medicare: TDB |
| | | Summary of Payments |
| | | Refund: $0.00 |
| | | Balance: $0.00 |
| My Account | | |

| Eligible Pay | Good afternoon, Jane Doe<br>Your Account Balance is $0.00   520 | |
|---|---|---|
| Summary | Wellness Checkup    -$290.00 | Payment method |
| Activity | | Visa Debit  ****1111 |
| | Status | Medicare  ****5555 |
| Wallet | | |
| Help | Processing by Rapid Clinic | Distribution of Payments |
| | Invoice received from Rapid Clinic | |
| | Claim form sent to Medicare | Visa Debit: $50.00 |
| | Processing by Medicare | Medicare: TDB |
| | | Summary of Payments |
| | | Refund: $0.00 |
| | | Balance: $0.00 |
| My Account | | |

| Eligible Pay | Good afternoon, Jane Doe  524<br>Your Account Balance is $0.00 |
|---|---|
| Summary<br><br>Activity<br><br>Wallet<br><br>Help<br><br><br><br><br><br><br><br><br><br>My Account | Wellness Checkup     -$290.00          Payment method<br><br>Status                                Visa Debit   **1111<br>                                      Medicare   5555<br>Processing by Rapid Clinic<br>                                     Distribution of<br>Invoice received from Rapid Clinic      Payments<br><br>Claim form sent to Medicare             Visa Debit: $50.00<br><br>Processing by Medicare                  Medicare:TBD<br><br>Claim rejected by Medicare             Summary of<br>                                       Payments**<br>                                     Refund: $0.00<br>        [ Resubmit ]<br>                                     Balance: $0.00 |

FIG. 5F

| | | |
|---|---|---|
| Eligible Pay | Good afternoon, Jane Doe<br>Your Account Balance is $0.00 | 528 |
| Summary<br><br>Activity<br><br>Wallet<br><br>Help<br><br><br><br><br><br><br><br><br><br><br>My Account | Wellness Checkup     -$290.00<br><br>Status<br><br>Processing by Rapid Clinic<br><br>Invoice received from Rapid Clinic<br><br>Claim form sent to Medicare<br><br>Processing by Medicare<br><br>Claim denied by Medicare | Payment method<br><br>Visa Debit   ****1111<br><br>Medicare   ****5555<br><br>Distribution of Payments<br><br>Visa Debit: $50.00<br><br>Medicare: $0.00<br><br>Summary of Payments<br><br>Refund: $0.00<br><br>Balance: $0.00 |

| Eligible Pay | Good afternoon, Jane Doe<br>Your Account Balance is $0.00    532 | |
|---|---|---|
| Summary<br><br>Activity<br><br>Wallet<br><br>Help<br><br><br><br><br><br><br><br><br><br><br><br>My Account | Wellness Checkup    $10.00<br><br>Status<br><br>Processing by Rapid Clinic<br><br>Invoice received from Rapid Clinic<br><br>Claim form sent to Medicare<br><br>Processing by Medicare<br><br>Claim approved by Medicare | Payment method<br><br>Visa Debit  ****1111<br><br>Medicare  ****5555<br><br>Distribution of Payments<br><br>Visa Debit: $50.00<br><br>Medicare: $300.00<br><br>Summary of Payments<br><br>Refund: $0.00<br><br>Balance: $0.00 |

| Eligible Pay | Good afternoon, Jane Doe<br>Your Account Balance is $0.00 | 536 |
|---|---|---|
| Summary<br><br>Activity<br><br>Wallet<br><br>Help<br><br><br><br><br><br><br><br><br><br>My Account | Wellness Checkup    $15.00<br><br>Status<br><br>Processing by Rapid Clinic<br><br>Invoice received from Rapid Clinic<br><br>Claim form sent to Medicare<br><br>Processing by Medicare<br><br>Claim approved by Medicare<br><br>Discount by Rapid Clinic | Payment method<br><br>Visa Debit  **1111<br><br>Medicare  5555<br><br>Distribution of Payments<br><br>Visa Debit: $50.00<br><br>Medicare: $300.00<br><br>Summary of Payments**<br><br>Refund: $0.00<br><br>Balance: $0.00 |

| Eligible Pay | Good afternoon, Jane Doe  540 |
| --- | --- |
| | Your Account Balance is $0.00 |

| | | |
| --- | --- | --- |
| Summary | Wellness Checkup    $15.00 | Payment method |
| Activity | | Visa Debit   ****1111 |
| | Status | Medicare   ****5555 |
| Wallet | | |
| Help | Processing by Rapid Clinic | Distribution of Payments |
| | Invoice received from Rapid Clinic | |
| | Claim form sent to Medicare | Visa Debit: $50.00 |
| | Processing by Medicare | Medicare: $300.00 |
| | Claim approved by Medicare | Summary of Payments |
| | Discount by Rapid Clinic | Refund: $15.00 |
| | Refund processed | Balance: $0.00 |
| | Completed | |
| My Account | | |

FIG. 5J

METHODS AND SYSTEMS FOR GENERATING GRAPHICAL USER INTERFACES FOR ELECTRONIC COMMUNICATION BETWEEN USERS, PROVIDER, AND PAYERS

CROSS-REFERENCE TO RELATED APPLICATION

This application claims the benefit of U.S. Provisional Application No. 62/776,984, filed on Dec. 7, 2018, which is hereby incorporated by reference in its entirety.

FIELD

The present disclosure relates generally to the generation of graphical user interfaces to facilitate electronic communication between network entities.

BACKGROUND

In the past, when a patient visits a doctor, a patient would receive services from the doctor, and the doctor would submit a claim to an insurance company for reimbursement. Or, in some cases, the patient would pay for the service in advance, and the patient would submit a claim to the insurance company for reimbursement. Often, the patient may have a balance due if the insurance does not cover the full amount of the services. In these cases, the insurance company or the doctor would send an invoice to the patient for payment. Insurance companies or doctors often have to write-off 50% of balances due because of lack of payment by the patient.

Moreover, while some of the communication between the insurance company and doctor can occur electronically, the patient is not included in this exchange. Thus, during this exchange, the patient is unaware of the communication between the doctor and the insurance company. As such, the patient is not informed of the status of a claim until an invoice is received from the insurance company or doctor.

SUMMARY

In some implementations, a method for generating a graphical user interface for establishing multiparty electronic communication includes generating, for interaction with a user, a dashboard for electronic resolution of a claim for a payer portion of a cost of an item. The method also includes calculating, in response to a selection in the dashboard, an estimated user portion of the cost of the item. Further, the method includes establishing a network interface for network communication between a provider of the item and the payer. Additionally, the method includes coordinating, via the network interface, the resolution of the payer portion of the cost of the item. The method also includes updating, in real-time, the dashboard with a status of the resolution of the payer portion of the cost.

Additionally, in some implementations, a non-transitory computer-readable medium stores instructions for causing one or more processors to perform a method for generating a graphical user interface for establishing multiparty electronic communication. The method includes generating, for interaction with a user, a dashboard for electronic resolution of a claim for a payer portion of a cost of an item. The method also includes calculating, in response to a selection in the dashboard, an estimated user portion of the cost of the item. Further, the method includes establishing a network interface for network communication between a provider of the item and the payer. Additionally, the method includes coordinating, via the network interface, the resolution of the payer portion of the cost of the item. The method also includes updating, in real-time, the dashboard with a status of the resolution of the payer portion of the cost.

Additionally, in some implementations, a method for generating a graphical user interface for establishing multiparty electronic communication includes generating, for interaction with a user, a dashboard for electronic resolution of a claim for a payer portion of a cost of an item. The method also includes receiving, via a first dedicated input embedded in the dashboard, a first selection to calculate an estimated user portion of the cost of the item. Further, the method includes receiving, via a second dedicated input embedded in the dashboard, a second selection to process payment of the estimated user portion of the cost of the item and initiate resolution of the claim for the payer portion of the cost of the item. The method additionally includes transmitting, to a server via a network, an electronic communication requesting the server to coordinate resolution of the payer portion of the cost of the item. The server establishes a network interface for network communication between a provider of the item and the payer. The method includes receiving, in real-time, status updates indicating a status of the resolution of the payer portion of the cost of the item. The method also includes updating, in real-time, the dashboard with the status of the resolution of the payer portion of the cost.

BRIEF DESCRIPTION OF THE DRAWINGS

The present disclosure will become better understood from the detailed description and the drawings, wherein:

FIGS. 5A-5J illustrate examples of graphical user interfaces included in a dashboard, according to various implementations.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

In addition, it should be understood that steps of the examples of the methods set forth in the present disclosure can be performed in different orders than the order presented in the present disclosure. Furthermore, some steps of the examples of the methods can be performed in parallel rather than being performed sequentially. Also, the steps of the examples of the methods can be performed in a network environment in which some steps are performed by different computers in the networked environment.

Some embodiments are implemented by a computer system. A computer system can include a processor, a memory, and a non-transitory computer-readable medium. The memory and non-transitory medium can store instructions for performing methods and steps described herein.

Figure 1A:
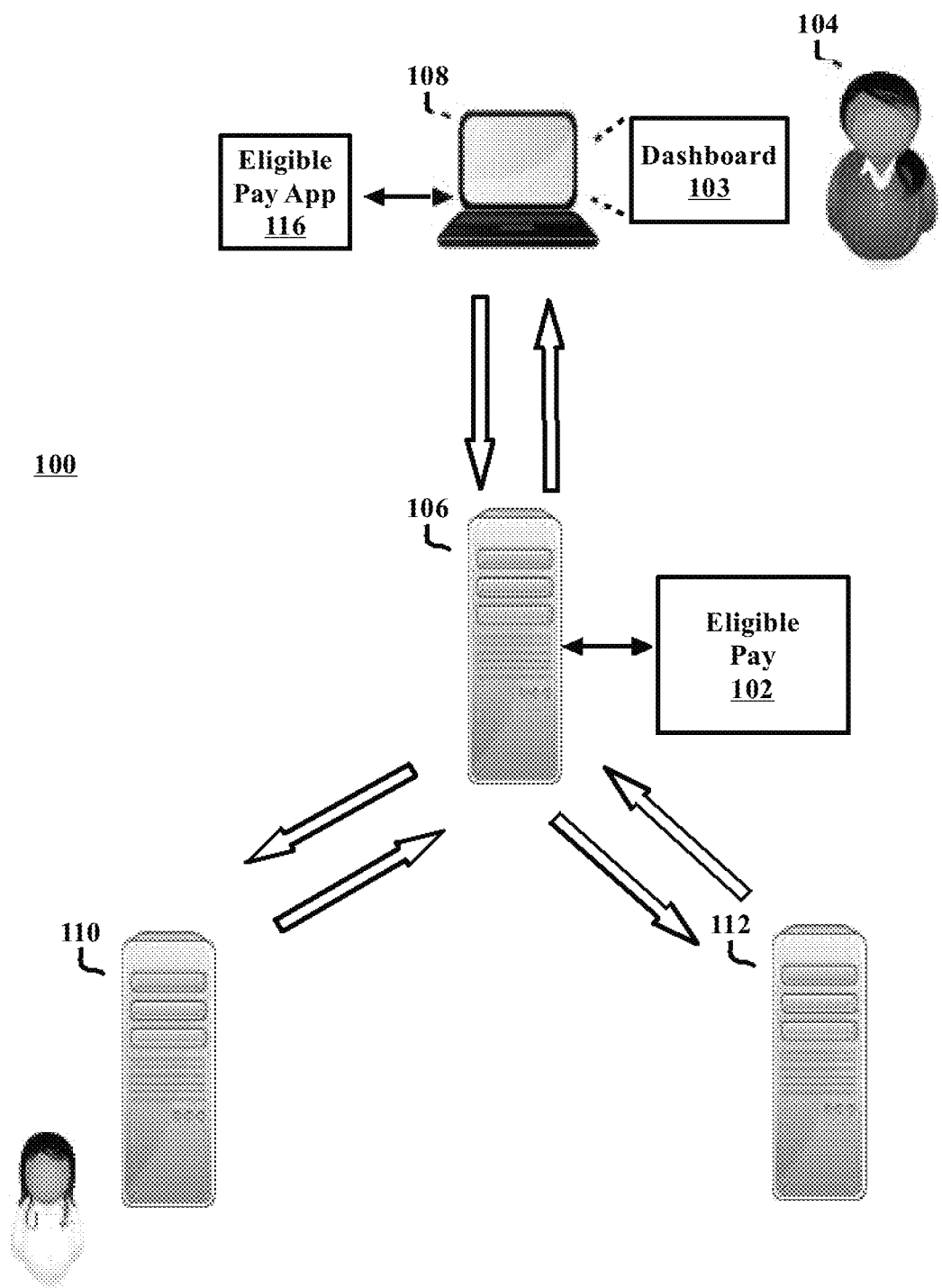
FIG. 1A illustrates a block diagram of an example of a network environment including an Eligible Pay system, according to various implementations.

FIG. 1A is a block diagram illustrating an example of a network environment 100 including an Eligible Pay system 102 that can be used in various implementations. While FIG. 1A illustrates various components contained in the network environment 100, FIG. 1A illustrates one example of a network environment and additional components can be added and existing components can be removed.

In various implementations, the Eligible Pay system 102 provides a unified system for facilitating electronic scheduling, acquisition, and payment resolution for items offered by a provider in which a payer may be responsible for a portion of a cost of the items. The Eligible Pay system 102 provides a dashboard 103 that allows a user 104 to electronically schedule or purchase the items, initiate payment resolution for the items, and monitor the payment resolution process. As described herein, a provider can be a provider of items such as a health service, procedure, or product. For example, providers include but are not limited to, doctors, therapists, nurses, health practitioners, hospitals, private medical practices, lab testing companies, medical device companies, and all other providers. A payer may be a payer of health insurance fees, such as an insurance company, Medicare, Medicaid, a patient, a third party, and the like. The user 104 may be a patient in need of or pursuing medical or health-related treatment, procedures, or products.

In various implementations, the Eligible Pay system 102 generates the dashboard 103 to allow the user to purchase or schedule items, resolve payment of the items through the provider and payer, and monitor the resolution process in real-time. The dashboard 103 is implemented as one or more graphical user interfaces (GUIs) that are presented to the user 104.

In various implementations, the Eligible Pay system 102 operates as the centralized facilitator of the electronic resolution of the payments between the user 104, the provider, and the payer. When an item is scheduled or purchased by a user 104, the Eligible Pay system 102 automatically generates any electronic forms required for resolutions and provides the electronic forms to the provider and payer. For example, the Eligible Pay system 102 generates, for an item, the necessary electronic data interchange (EDI) Health Care Claim Payment/Advice Transaction Set (EDI 835) and EDI Health Care Claim Transaction set (EDI 837). The EDI 835 can be used to make a payment, send an Explanation of Benefits (EOB), send an Explanation of Payments (EOP) remittance advice, or make a payment and send an EOP remittance advice only from a health insurer to a health care provider either directly or via a financial institution. The EDI 837 can be used to submit health care claim billing information, encounter information, or both.

Once the forms are generated, the Eligible Pay system 102 serves as the centralized network hub for the electronic communication of the forms by coordinating the communication between the provider and the payer. As the electronic communications are coordinated by the Eligible Pay system 102, the Eligible Pay system 102 updates the status of the resolution in the dashboard 103, in real-time.

The Eligible Pay system 102 can be implemented in one or more computer systems 106. The computer systems 106 can be any type of computer systems, such as server computers, that are capable of operating the Eligible Pay system 102. The computer systems 106 electronically communicate with a user computer system 108, computer systems 110, and computer systems 112. For example, the computer systems 106 can electronically communicate with the user computer system 108, the computer systems 110, and the computer systems 112 via one or more networks. The one or more networks can include local area networks (LANs), wide area networks (WANs), telephone networks, such as the Public Switched Telephone Network (PSTN), an intranet, the Internet, or a combination thereof. It should be understood that where the terms server or computer system are used, this includes the use of networked arrangements of multiple devices operating as a server or computer system. For example, distributed or parallel computing can be used.

The user computer system 108 can be any type of computer system capable of communicating with and interacting with the computer systems 106 operating the Eligible Pay system 102. Likewise, the computer systems 110 and the computer systems 112 can be any type of computer system capable of communicating with and interacting with the computer systems 106 operating the Eligible Pay system 102. As described herein, the computer systems 106, the user computer system 108, the computer system 110, and the computer systems 112 can include any of a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise).

The Eligible Pay system 102 provides a dashboard 103 for the user 104 to interact with the Eligible Pay system 102. The dashboard 103 can be generated by the Eligible Pay system 102, operating on the computers systems 106, and accessed remotely by the user computer system 108 over the one or more networks. For example, the dashboard 103 can be implemented as a web-based interface that is hosted by the computer system 106 and accessed remotely by the user computer system 108. The dashboard 103 can be generated by an Eligible Pay application 116, operating on the user computers system 108, and the Eligible Pay application 116 can electronically communicate with the Eligible Pay system 102 over the one or more networks.

In implementations, the Eligible Pay system 102 can be accessed through third-party systems. In some implementations, a network link can be embedded in a third-party application or website that allows access to the Eligible Pay system 102 through the third-party application or website. When the network link is selected by a user in the third-party application or website, the Eligible Pay system 102 can generate the dashboard 103 and provide the dashboard through the third-party application or website. As such, the user can access the functionality of the Eligible Pay system 102 (e.g., payment processing) for transactions performed on the third-party application or website, as described below in detail.

For example, a healthcare marketplace may offer procedures from different health care providers in a single forum. To access the advantages of the Eligible Pay system 102, the healthcare marketplace can include a network link to the Eligible Pay system 102 with the procedures offered in the healthcare marketplace. When the user wants to purchase a procedure, the user can select the network link to the Eligible pay system 102. In response, the Eligible Pay system 102 generates the dashboard 103 and provides the dashboard 103 through the healthcare marketplace. The user, via the dashboard, can log-on to the Eligible Pay system 102 and access the functionality of the Eligible Pay system 102, such as paying for the procedure purchased on the healthcare marketplace as described in detail below.

Figure 1B:
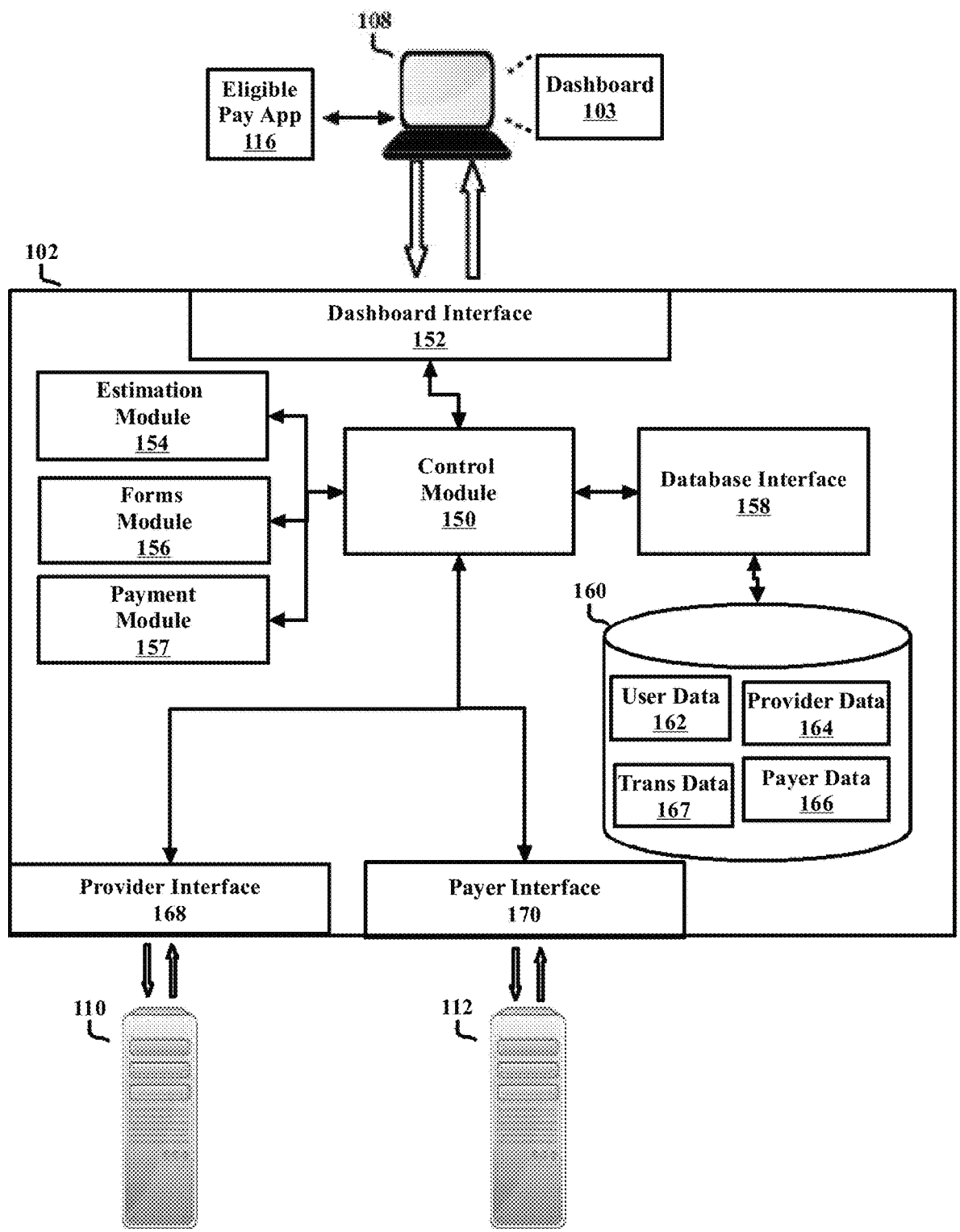
FIG. 1B illustrates a block diagram of an example of the Eligible Pay system, according to various implementations.

FIG. 1B is a block diagram illustrating an example of the Eligible Pay system 102 that can be used in various implementations. While FIG. 1B illustrates various components contained in the Eligible Pay system 102, FIG. 1B illustrates one example of the Eligible Pay system 102 and additional components can be added and existing components can be removed.

In various embodiments, the Eligible Pay system 102 (and the components of the Eligible Pay system 102) are implemented as software programs or modules that perform the methods, process, and protocols described herein. The software programs or modules can be written in a variety of programming languages, such as JAVA, C++, Python code, Visual Basic, hypertext markup language (HTML), extensible markup language (XML), and the like to accommodate a variety of operating systems, computing system architectures, etc. As illustrated in FIG. 1B, the Eligible Pay system 102 includes one or more software modules such as a control module 150, a dashboard interface 152, an estimation module 154, a forms module 156, a payment module 157, a database interface 158, a provider interface 168, and a payer interface 170.

The control module 150 is configured to manage and interface with the other modules 152-158, 168, and 170 to provide the functionality of the Eligible Pay system 102 as described above and further described herein below.

The dashboard interface 152 is configured to coordinate the exchange of information between the user 104 and the Eligible Pay system 102 via dashboard 103. In some implementations, the dashboard interface 152 can be configured to generate GUIs, e.g. web pages, as required by the control module 150 for the exchange of information with the user 104. For example, dashboard interface 152 can be configured to generate the dashboard 103 to allow a user to schedule or request an item, initiate payment of the item, estimate the cost of the item, and monitor the status of the resolution of the payment, in real-time.

In some implementation, the dashboard interface 152 can be configured to exchange electronic communications with the Eligible Pay application 116 that is operating on the user computer system 108 and generating the dashboard 103. For example, the dashboard interface 152 can be configured to provide one or more application programming interfaces (APIs) by which the Eligible Pay application 116 can communicate with the Eligible Pay system 102 and access the processes and functionality provided by the Eligible Pay system 102.

In some implementations, the dashboard interface 152 can be configured to provide one or more APIs that allow the processes and functionality provided by the Eligible Pay system 102 to be utilized by third-party systems. For example, the dashboard interface 152 can be configured to provide one or more APIs that allow a link or application to initiate the Eligible Pay system 102 to be embedded in third party websites.

The database interface 158 is configured to communicate with a database 160. The database interface 158 can be configured to allow the control module 150 to search for data within the database 160, retrieve data from the database 160, and store data within the database 160. The database 160 can be constructed in any form such as table-based or non-table-based database, Structured Query Language (SQL) database, Non-SQL (NoSQL) databases, and other forms of data storage. The database 160 can be located in the computer system 106 operating the Eligible Pay system 102. Likewise, the database 160 can be located remotely from the computer systems 106, and remotely accessed by the database interface 158. Further, while database 160 is illustrated as a single database, the database 160 can include multiple databases, whether stored locally or remotely from the computer systems 106.

The database 160 stores information that is utilized by the Eligible Pay system 102 for facilitating electronic scheduling, acquisition, and payment resolution for items offered by the provider. The database 160 can store user data 162, provider data 164, payer data 166, and transaction data 167.

The user data 162 can include information about the user 104 required by the Eligible Pay system 102 to electronic schedule, acquire, and resolve payment for items offered by the provider. For example, the user data 162 can include demographic information, such as name, age, gender; payer information associated with the user 104, such as the plan, group, and insurance company name; provider information associated with the user 104, such as a list of provider used by the user 104; payment information, such as credit card, bank account, or health savings account (HSA) information; and security information, such as login and password.

The provider data 164 can include information and details about the items offered by the payer. For example, the provider data 164 can include demographics about the provider, such as name, address, insurance accepted; items offered by the provider, such as services, procedures, products, etc.; and fee schedules, charges, adjustments, and discounts for the items offered by the provider. A fee schedule can comprise schedules of common service codes, such as a current procedural terminology (CPT) codes or healthcare common procedure coding system (HCPCS) codes, used by the provider and associated fees charged by the provider for those items.

The payer data 166 can include information about health plans or benefits offered by the payer. For example, the payer data 166 can include information about what procedures or services are covered and what level, type, or amount of benefits are provided for each benefit or service. Likewise, for example, the payer data 166 can include information about pricing, about providers that are in or out of network, about the necessity of pre-authorizations for some procedures or services, about medical necessity analysis, and about providers.

The transaction data 167 can include transaction data about items purchased by the user 104. For example, the transaction data 167 can include visits and encounters, including charges by the provider, the payment by the payer, discounts, adjustments, EDI 835 and EDI 837 information, and other information. Each transaction can include information such as patient information including name, address, and demographic information (or link to the demographic data), date of service, and information about the service provided. Information about service provided can include a standardized procedure code such as CPT codes or HCPC codes. The charge can also include demographic information about the patient, the identity of the insurance company and plan, and information about the provider for the charge.

In some implementations, the database interface 158 can transform any of the stored data, such as the transaction data 167 into a standard and common format across providers and payers. For example, data from individual providers may be stored and presented in idiosyncratic and unique ways, and the database interface 158 can transform the data into a common format to allow efficiency in database searching and reduce storage based by removing the need to store multiple formats. For example, the database interface 158 can structure the data into two types of entities: encounters and charges. Each entity can include a data structure. A charge can represent a particular procedure received by a patient on a date of service. An encounter can represent all procedures received by a patient on a date of service. Encounters and charges can each comprise a billed amount, a contractual allowed amount, payments (from a payer, a patient, or other entity), adjustments (from a payer, patient, or other entity), and denials of payment, such as from a payer.

The estimation module 154 is configured to estimate the cost of an item, the user's portion of the estimated cost and the payer's portion of the estimated cost. The estimation module 154 can be configured to calculate the estimate the cost of an item, the user's portion of the estimated cost and the payer's portion of the estimated cost using one or more models. In implementations, the estimation module 154 can determine a Perfect Possible Accuracy (PPA) to see how much accuracy can be obtained using AI and statistical methods. If the PPA is determined to be above a threshold, then it is determined to proceed to try to perform prediction for this provider. If the PPA is determined to be below a threshold, then it is determined not to proceed to perform predictions for the provider. If the determination proceeds, the estimation module 154 can be configured to build and utilize a set of models including a price model, network model, pre-authorization model, risk assessment model, and provider model. These models are combined by the main model that accepts as input the resulting predictions of the price model, network model, pre-authorization model, risk assessment model, and provider model, and outputs a final predicted price of a procedure or service and a prediction of whether the payer will accept or deny the claim. The main model can be a deterministic algorithm using hard-coded rules to algebraically combined the results of the price model, network model, pre-authorization model, risk assessment model, and provider model. A complete description of the estimation process can be found in U.S. Provisional Application No. 62/725,273, filed Aug. 31, 2018, the entire contents of which are incorporated herein by reference.

The forms module 156 is configured to communicate with database interface 158 to generate forms necessary to resolve the payment between the payer and the provider. When a user 104 initiates the payment processing for an item, the forms module 156 can be configured to communicate with the database interface 158 to retrieve relevant information on the user 104, the payer, and the provider to generate the forms to be transmitted to the payer and provider. For example, the forms module 156 can be configured to generate the EDI 835 and EDI 837 to resolve payment between the payer and the provider.

The payment module 157 is configured to process payment of the user's portion of the estimated cost. When a user 104 initiates purchase or scheduling for an item, the payment module 157 can be configured to communicate with the estimation module 154 to retrieve the user's portion of the estimated cost, and communicate with the database interface 158 to retrieve relevant payment information for the user 104. Once retrieved, the payment module 157 is configured to electronic process payment of the user's portion of the estimated cost using the stored payment information, e.g., credit card information, bank account information, health saving account (HSA) information, etc.

The provider interface 168 is configured to coordinate the exchange of information between the Eligible Pay system 102 and the computer systems 110 of the provider. In some implementations, the provider interface 168 can be configured to generate one or more network location, as required by the control module 150 for the exchange of information with the computer systems 110 of the provider. For example, the provider interface 168 can be configured to generate one or more uniform resource locators (URLs) for the exchange of information with the computer systems 110 of the provider. For example, the provider interface 168 can be configured to post the generated forms (e.g., EDI 835) at the URLs and receive data from the computer systems 110 of the provider.

In some implementations, the provider interface 168 can be configured to exchange electronic communications with the applications that are operating on the computer systems 110 of the provider. For example, the provider interface 168 can be configured to provide one or more APIs by which the applications can communicate with the Eligible Pay system 102.

The payer interface 170 is configured to coordinate the exchange of information between the Eligible Pay system 102 and the computer systems 112 of the payee. In some implementations, the payer interface 170 can be configured to generate one or more network location, as required by the control module 150 for the exchange of information with the computer systems 112 of the payee. For example, the payer interface 170 can be configured to generate one or more uniform resource locators (URLs) for the exchange of information with the computer systems 112 of the payee. For example, the payer interface 170 can be configured to post the generated forms (e.g., EDI 835) at the URLs and receive data from the computer systems 112 of the payee.

In some implementations, the payer interface 170 can be configured to exchange electronic communications with the applications that are operating on the computer systems 112 of the payee. For example, the payer interface 170 can be configured to provide one or more APIs by which the applications can communicate with the Eligible Pay system 102.

Figure 2:
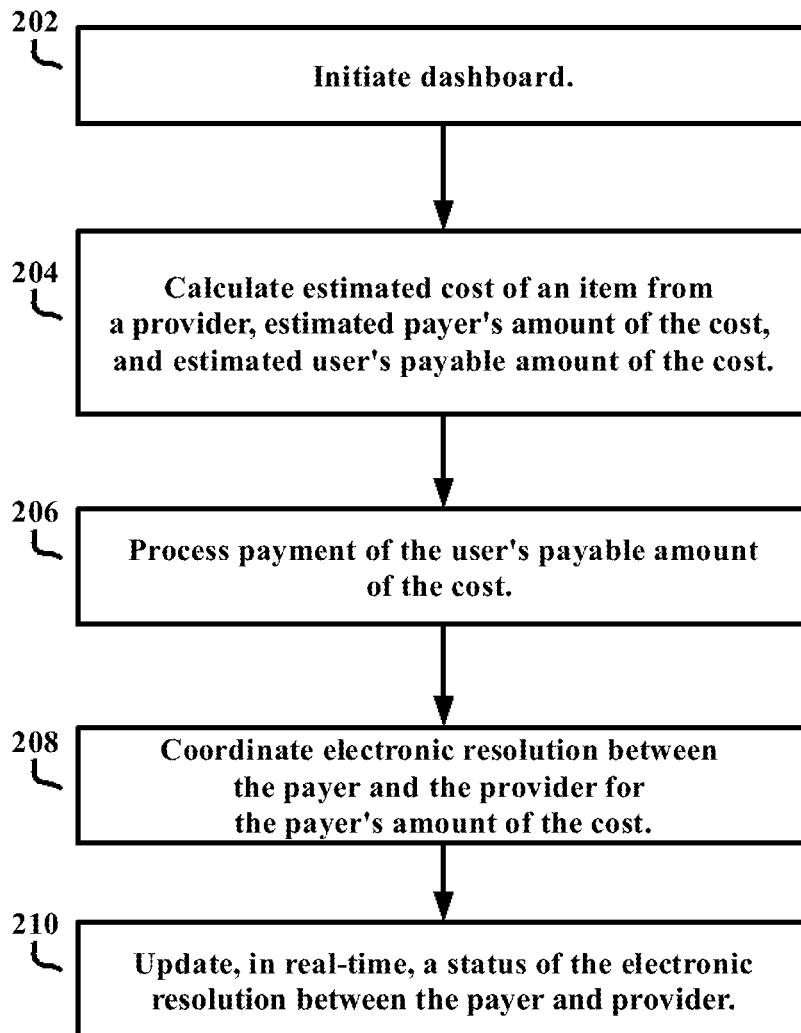
FIG. 2 illustrates an example of a method for operating the Eligible Pay system, according to various implementations.

FIG. 2 illustrates an example of a method 200 for operating the Eligible Pay system, according to various implementations. While FIG. 2 illustrates various stages that can be performed, stages can be removed and additional stages can be added. Likewise, the order of the illustrated stages can be performed in any order.

In 202, a dashboard is initiated. In some implementations, the dashboard 103 can be initiated by accessing, using the user computer system 108, a website generated and hosted by the Eligible Pay system 102. In some implementations, the dashboard 103 can be initiated by accessing, using the user computer system 108, a link contained in a third-party website. In some implementations, the dashboard 103 can be initiated by selecting and executing the Eligible Pay application 116 on the user computer system 108.

In 204, an estimated cost of an item from a provider, a payer's amount of the estimated cost, and the user's payable amount of the estimated cost are calculated. In some implementations, prior to receiving the item, e.g., medical procedure, the Eligible Pay system 102 can calculate the estimated cost of the item and the user's payable amount of the estimated cost. The Eligible Pay system 102 can retrieve the payer information associated with the user 104 (e.g., insurance information and coverage information), the provider information associated with the item (e.g., charges for the item) as well as historic data such as past payment by the payer and prior charges for the provider. Utilizing this information, the Eligible Pay system 102 can calculate the estimated cost of the item and the user's payable amount of the estimated cost by building and utilizing a main model that accepts as input resulting predictions of a price model, network model, pre-authorization model, risk assessment model, and provider model, and outputs a final predicted price of a procedure or service and a prediction of whether the payer will accept or deny a payment for an item. A complete description of the estimation process can be found in U.S. Provisional Application No. 62/725,273, filed Aug. 31, 2018, the entire contents of which are incorporated herein by reference.

In 206, payment of the user's payable amount of the cost is processed. In some implementations, the Eligible Pay system 102 can access payment information of the user 104 and process the payment using the payment information. The payment information can include credit card information of the user 104, bank account information of the user 104, HSA information of the user 104, and combination thereof.

In 208, the electronic resolution between the payer and the provider for the payer's amount of the cost is coordinated. In some implementations, the Eligible Pay system 102 can generate an electronic receipt form (e.g., EDI 835) that indicates payment of the user's payment amount of the estimated cost and provide the electronic receipt form to the provider. In response, the Eligible Pay system 102 can receive an electronic invoice from the provider. The Eligible Pay system 102 can generate an electronic claim form (e.g., EDI 835) that indicates payment of the user's payment amount of the estimated cost and the invoice amount from the provider and provide the electronic claim form to the payer. The Eligible Pay system 102 can receive an adjudication of the claim from the payer and automatically take additional actions if necessary, such as resubmitting the electronic claim form, applying discounts and adjustments from the provider, refunding payments to the user 104, processing additional payments from the user 104, and the like.

In some implementations, to communicate with the provider and payer, the Eligible Pay system 102 can generate network location (e.g., URLs) for posting forms and receiving a response from the provider and the payer. In some implementations, the Eligible Pay system 102 can provide one or more APIs to exchange electronic communications with the provider and the payer.

In 210, a status of the electronic resolution between the payer and the provider is updated, in real-time. In some implementations, the Eligible Pay system 102 updates the dashboard 103, in real-time, as the electronic communications are posted to the provider and payer and received from the provider and payer.

Figure 3A:
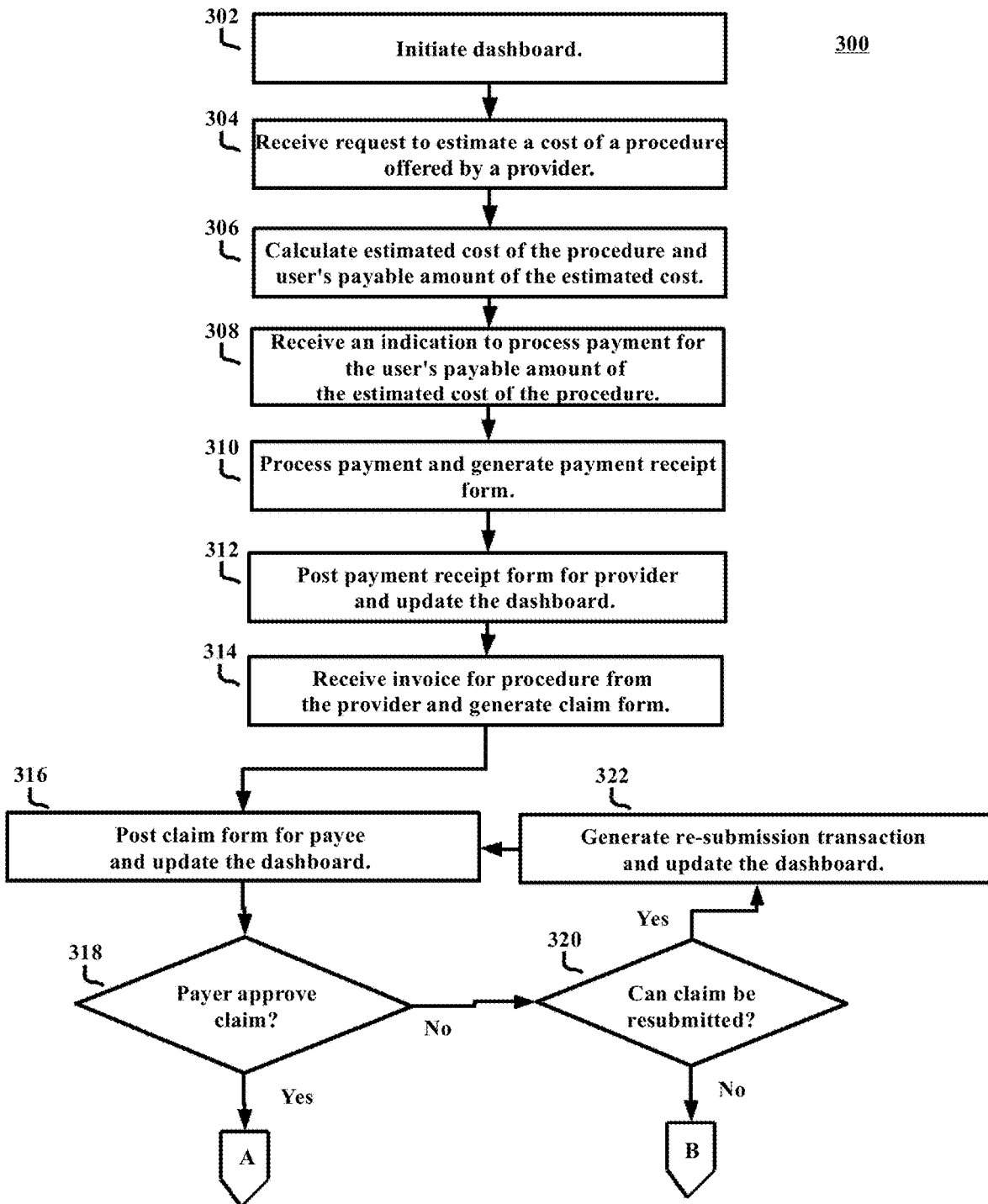
FIGS. 3A and 3B illustrate another example of a method for operating the Eligible Pay system, according to various implementations.
Figure 3B:
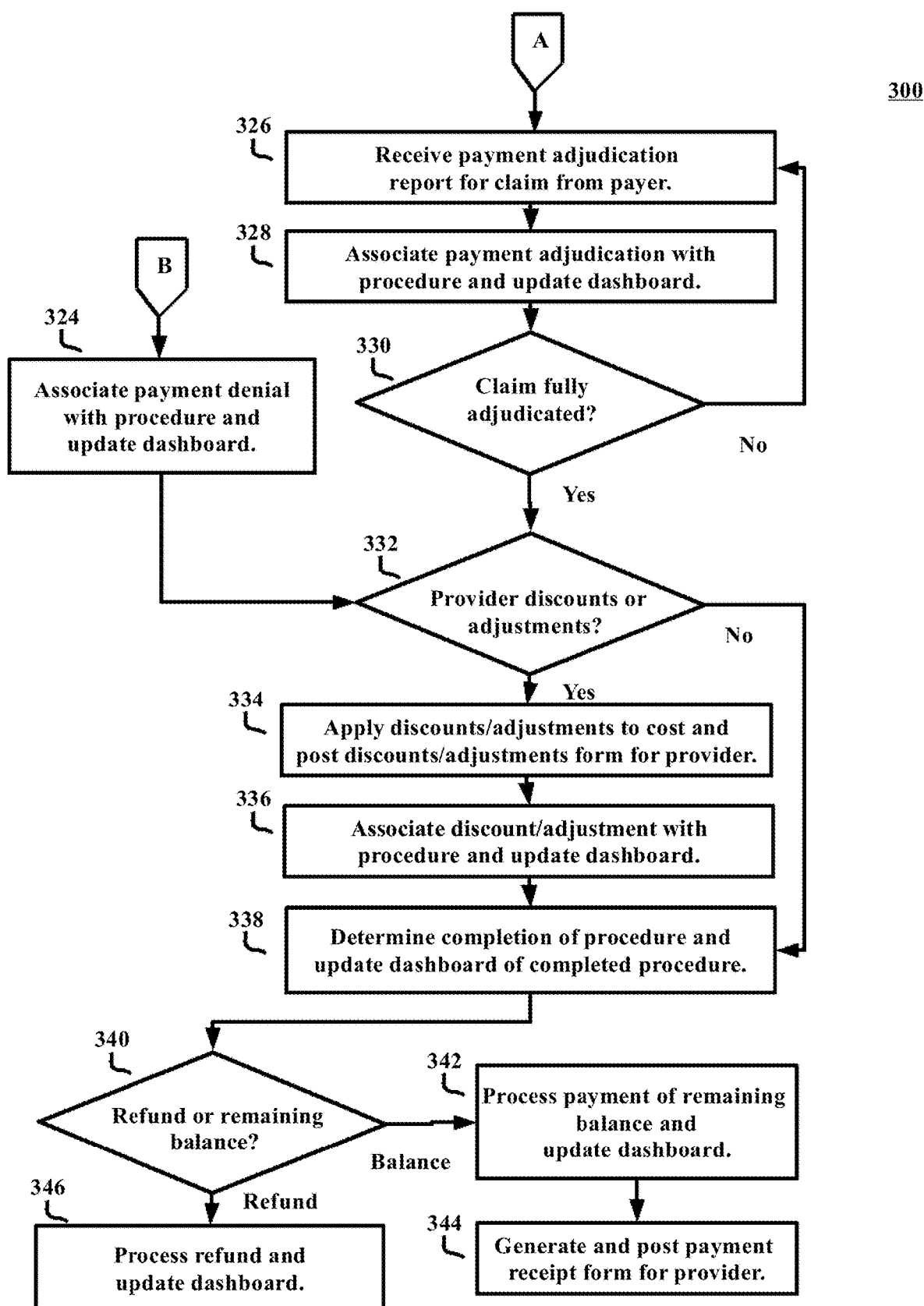

FIGS. 3A and 3B illustrate an example of a method 300 for operating the Eligible Pay system, according to various implementations. While FIGS. 3A and 3B illustrate various stages that can be performed, stages can be removed and additional stages can be added. Likewise, the order of the illustrated stages can be performed in any order.

Figure 4A:
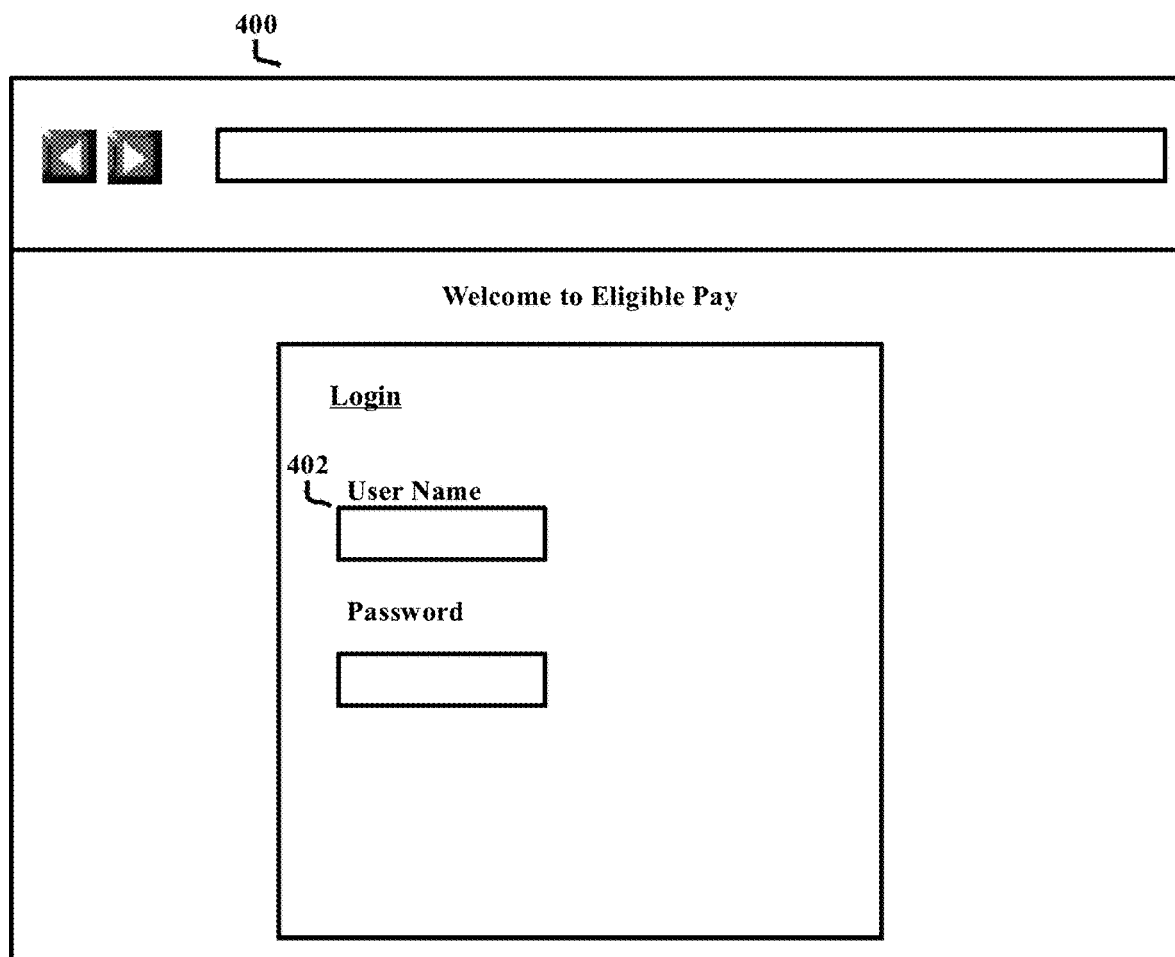
FIGS. 4A-4C illustrate examples of graphical user interfaces for initiating the Eligible Pay system, according to various implementations.

In 302, a dashboard is initiated. In some implementations, the dashboard 103 can be initiated by accessing, using the user computer system 108, a website generated and hosted by the Eligible Pay system 102. For example, the dashboard interface 152 of the Eligible Pay system 102 can generate GUIs, e.g. web pages, as required by the control module 150 for the exchange of information with the user 104. FIG. 4A illustrates one example of a website 400 for accessing the Eligible Pay system 102. As illustrated in FIG. 4A, the website 400 can include input fields 402 that allows the user 104 to enter access information.

Figure 4B:
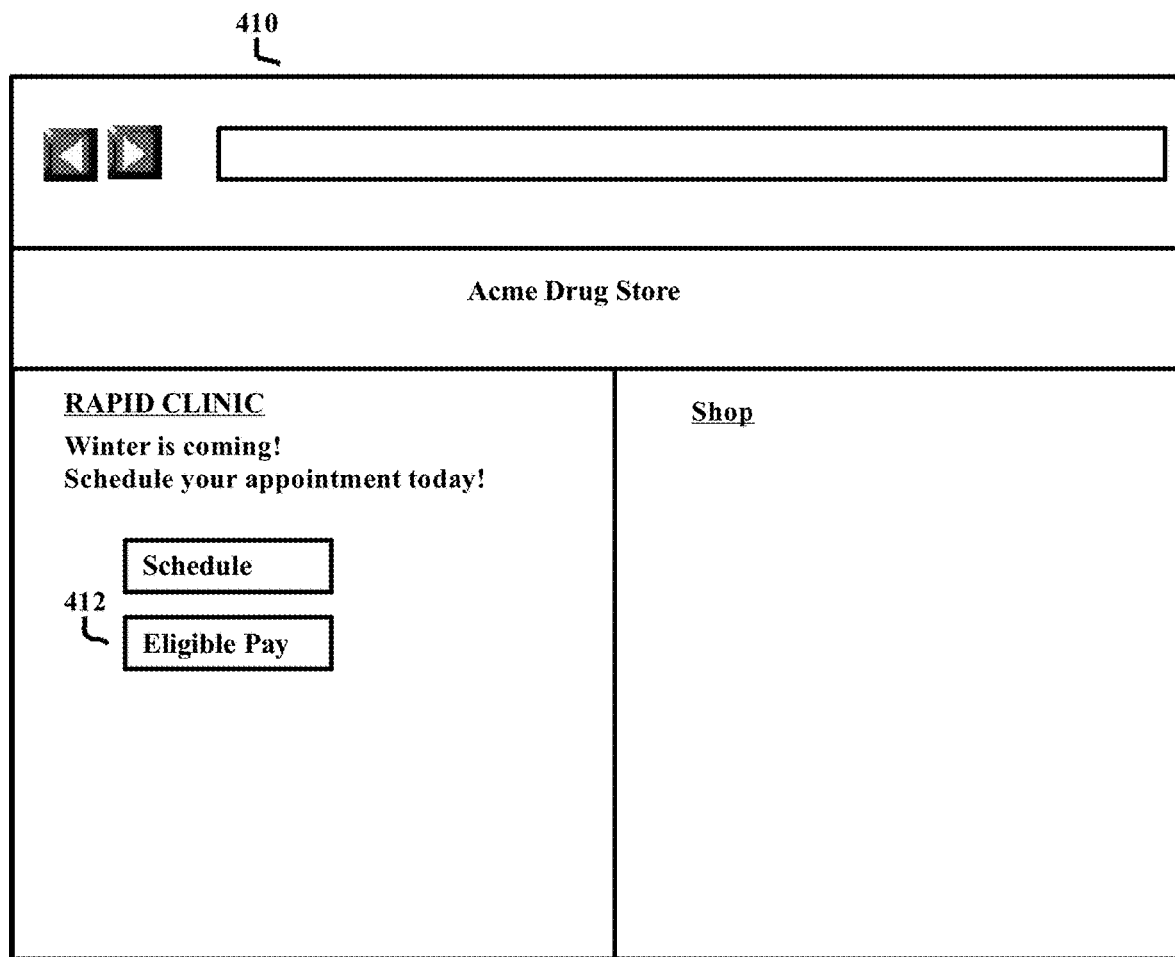

In some implementations, the dashboard 103 can be initiated by accessing, using the user computer system 108, a link contained in a third-party website, such as a healthcare marketplace, health care provider, etc. For example, the dashboard interface 152 of the Eligible Pay system 102 can provide one or more APIs that allow a link or application to initiate the Eligible Pay system 102 to be embedded in third party websites. FIG. 4B illustrates one example of a third-party website 410 for accessing the Eligible Pay system 102. As illustrated in FIG. 4A, the third-party website 410 can include an activation link 412 that allows the user 104 to launch the Eligible Pay system 102.

Figure 4C:
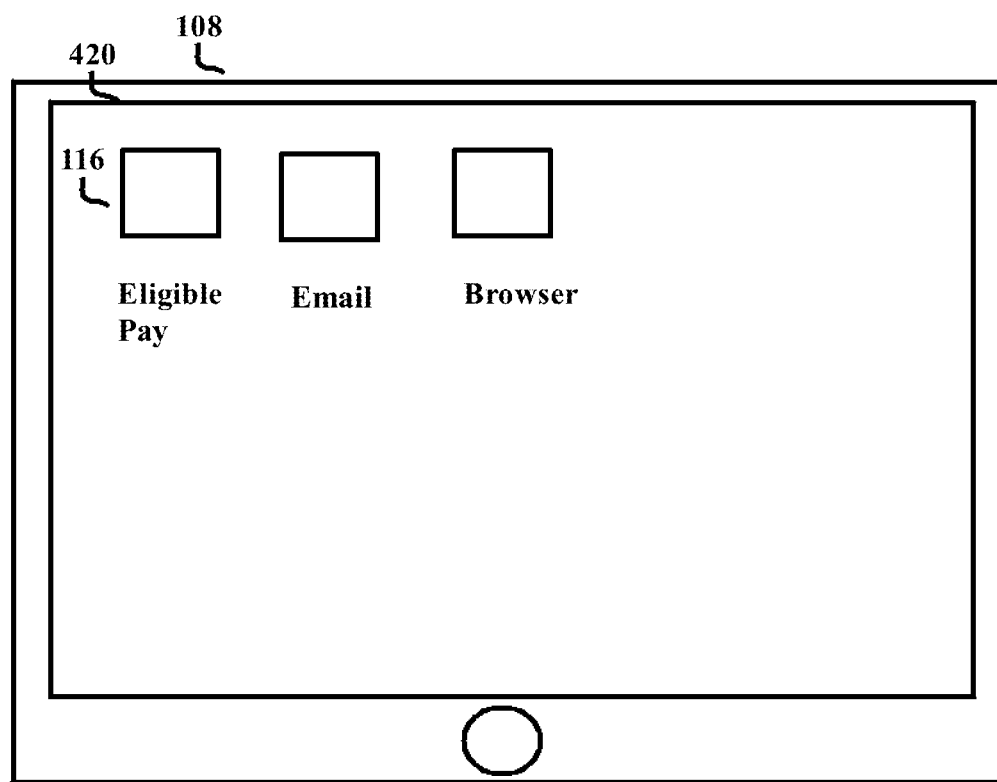

In some implementations, the dashboard 103 can be initiated by selecting and executing the Eligible Pay application 116 on the user computer system 108. For example, the dashboard interface 152 of the Eligible Pay system 102 can provide one or more APIs by which the Eligible Pay application 116 can communicate with the Eligible Pay system 102 and access the processes and functionality provided by the Eligible Pay system 102. FIG. 4C illustrates one example of a display 420 of the user computer system 108 for initiating the Eligible Pay application 116.

Figure 5A:
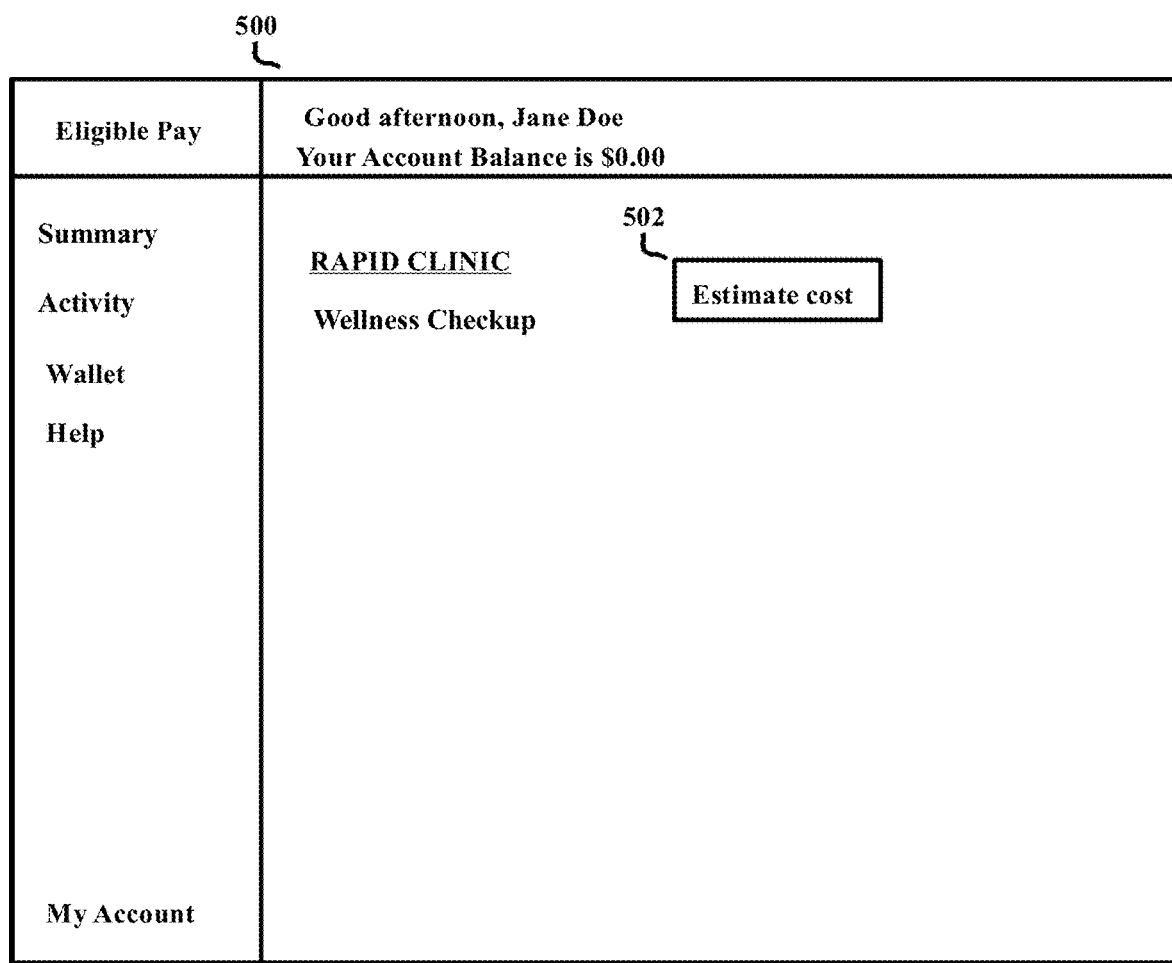

In 304, a request to estimate the cost of a procedure offered by a provider is received. In some implementations, the dashboard 103 can include an activation field to allow the user 104 to initiate the calculation of the estimated cost. When activated, the dashboard interface 152 of the Eligible Pay system 102 can pass the request to the estimation module 154. FIG. 5A illustrates one example of a GUI 500 in dashboard 103 for requesting cost estimation. As illustrated in FIG. 5A, the GUI 500 can include an activation field 502 for requesting cost estimation.

In 306, an estimated cost of the procedure and the user's payable amount of the estimated cost is calculated. In some implementations, in response to the request, the estimation module 154 of the Eligible Pay system 102 can calculate the estimated cost of the item e.g., medical procedure, and the user's payable amount of the estimated cost. The estimation module 154 of the Eligible Pay system 102 can request, from the database interface 158, retrieval of the payer information associated with the user 104 (e.g., insurance information and coverage information), the provider information associated with the item (e.g., charges for the item) as well as historical data such as past payment by the payer and prior charges for the provider. Utilizing this information, the estimation module 154 of the Eligible Pay system 102 can calculate the estimated cost of the item and the user's payable amount of the estimated cost by building and utilizing a main model that accepts as input resulting predictions of a price model, network model, pre-authorization model, risk assessment model, and provider model, and outputs a final predicted price of a procedure or service and a prediction of whether the payer will accept or deny a payment for an item. A complete description of the estimation process can be found in U.S. Provisional Application No. 62/725,273, filed Aug. 31, 2018, the entire contents of which are incorporated herein by reference.

Figure 5C:
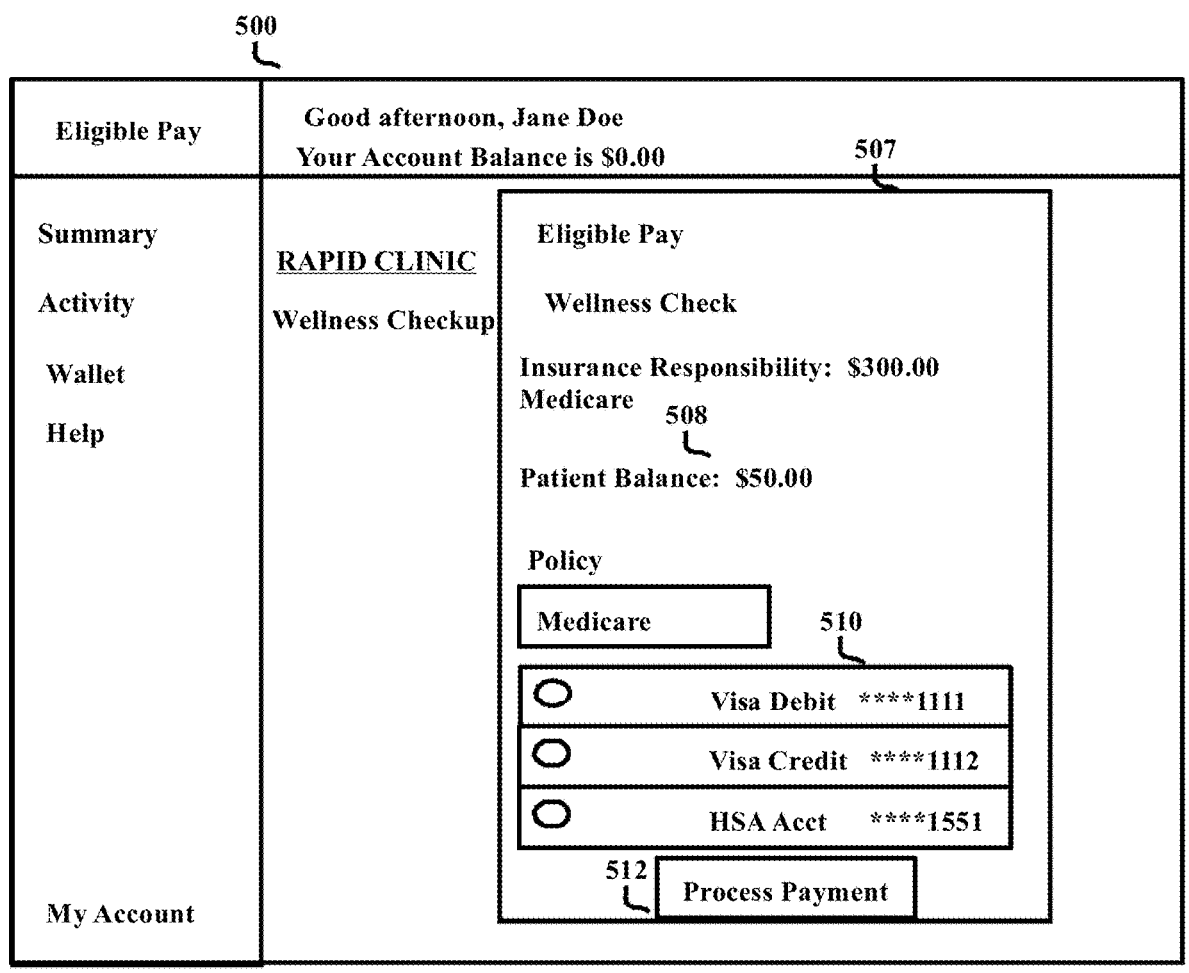

In 308, an indication to process payment for the user's payable amount of the estimated cost of the procedure is received. In some implementations, the dashboard 103 can include an activation field to allow the user 104 to initiate the calculation of the estimated cost. When activated, the dashboard interface 152 of the Eligible Pay system 102 can pass the request to the payment module 157. FIG. 5B illustrates one example of a GUI 506 in dashboard 103 for requesting payment processing. FIG. 5C illustrates one example of a GUI 507 for selecting payment information. As illustrated in FIG. 5C, the GUI 507 can include information field 508 for displaying the user's payable amount of the estimated cost, a selection field 510 for selecting a form of payment, and an activation field 512 for requesting payment processing.

In 310, the payment is processed, and a payment receipt form is generated. In some implementations, the payment module 157 of the Eligible Pay system 102 can request that the database interface 158 retrieve the payment information of the user 104, selected by the user 104, and electronically process the payment using the payment information. The payment information can include credit card information of the user 104, bank account information of the user 104, HSA information of the user 104, and combination thereof. Once processed, the payment module 157 can pass the payment receipt to the database interface 158 for storage and pass the payment receipt to the forms module 156 for generation of a payment receipt form. In response, the forms module 156 of the Eligible Pay system 102 can generate an electronic receipt form (e.g., EDI 835) that indicates payment of the user's payment amount of the estimated cost.

In 312, the payment receipt is posted for the provider, and the dashboard is updated. In some embodiments, the payment module 157 can pass the electronic receipt form to the provider interface 168 for posting to the provider. In some implementations, to communicate with the provider, the provider interface 168 of the Eligible Pay system 102 can generate network locations (e.g., URLs) for posting forms and receiving a response from the provider. In some implementations, the provider interface 168 of the Eligible Pay system 102 can provide one or more APIs to exchange electronic communications with the provider and the payer. Once posted, the dashboard interface 152 can update the dashboard with the current status. FIG. 5D illustrates one example of a GUI 514 in dashboard 103 for displaying the status of the payment resolution. As illustrated in FIG. 5D, the GUI 514 can include information fields 516 for displaying the status of the payment resolution.

In 314, an invoice for the procedure is received from the provider, and a claim form is generated. In some implementations, the provider interface 168 can receive an electronic invoice from the provider. The provider interface 168 can pass the electronic invoice to the database interface 158 for storage and pass the electronic invoice to the forms module 156 for generation of an electronic claim form. In response, the forms module 156 of the Eligible Pay system 102 can request that the database interface 158 retrieve the payer information. Once retrieved, the forms module 156 can generate an electronic claim form (e.g., EDI 835) that requests payment of the invoice amount from the provider (less the user's payable amount).

In 316, the claim form is posted for the payee and the dashboard is updated. In some implementations, the forms module 156 can pass the electronic claim form to the payer interface 170 for posting to the payer. In some implementations, to communicate with the provider, the payer interface 170 of the Eligible Pay system 102 can generate network locations (e.g., URLs) for posting forms and receiving a response from the provider and the payer. In some implementations, the payer interface 170 of the Eligible Pay system 102 can provide one or more APIs to exchange electronic communications with the payer. Once posted, the dashboard interface 152 can update the dashboard with the current status. FIG. 5E illustrates one example of a GUI 518 in dashboard 103 for displaying the status of the payment resolution. As illustrated in FIG. 5E, the GUI 518 can include information field 520 for displaying the status of the payment resolution.

In 318, it is determined whether the claim is approved by the payer. If the claim is not approved, in 320, it is determined whether the claim can be resubmitted. If the claim can be resubmitted, in 322, a re-submission transaction is generated, and the dashboard is updated. In some implementations, the forms module 156 can pass the electronic claim form to the payer interface 170 for posting to the payer. Once posted, the dashboard interface 152 can update the dashboard with the current status. FIG. 5F illustrates one example of a GUI 522 in dashboard 103 for displaying the status of the payment resolution. As illustrated in FIG. 5F, the GUI 522 can include information field 524 for displaying the status of the payment resolution and selection of resubmission.

If the claim cannot be resubmitted, in 324, the payment denial is associated with the procedure, and the dashboard is updated. In some implementations, the dashboard interface 152 can update the dashboard with the current status. FIG. 5G illustrates one example of a GUI 526 in dashboard 103 for displaying the status of the payment resolution. As illustrated in FIG. 5G, the GUI 526 can include information field 528 for displaying the status of the payment resolution and the denial.

If the claim is approved, in 326, a payment adjudication report for the claim is received from the payer. In some implementations, the payer interface 170 can receive an electronic payment adjudication report from the payer. The payer interface 170 can pass the electronic payment adjudication report to the database interface 158 for storage.

In 328, the payment adjudication is associated with the procedure, and the dashboard is updated. In some implementations, the dashboard interface 152 can update the dashboard with the current status. FIG. 5H illustrates one example of a GUI 530 in dashboard 103 for displaying the status of the payment resolution. As illustrated in FIG. 5H, the GUI 530 can include information field 532 for displaying the status of the payment resolution and the adjudication.

In 330, it is determined whether the claim is fully adjudicated. If the claim is not fully adjudicated, the method 300 return to 326. If the claim is fully adjudicated, the method proceeds to 332. In 332, it is determined whether provider discounts or adjustments are available. In some implementations, the database interface 158 can search and retrieve any discounts and adjustments associated with the provider and pass the information to the control module 150.

If discounts are available, in 334, the discounts and adjustments are applied to the cost of the procedure, and discounts and adjustments form is posted for the provider. In some implementations, the forms module 156 can generate a discounts and adjustments form and pass the electronic claim form to the provider interface 168 for posting to the provider.

In 336, the discounts and adjustments are associated with the procedure, and the dashboard is updated. In some implementations, the dashboard interface 152 can update the dashboard with the current status. FIG. 5I illustrates one example of a GUI 534 in dashboard 103 for displaying the status of the payment resolution. As illustrated in FIG. 5I, the GUI 534 can include information field 536 for displaying the status of the payment resolution.

In 338, the completion of the procedure is determined, and the dashboard is updated with the completed procedure. FIG. 5J illustrates one example of a GUI 538 in dashboard 103 for displaying the status of the payment resolution. As illustrated in FIG. 5J, the GUI 540 can include information field 536 for displaying the status of the payment resolution.

In 340, it is determined whether a refund or a remaining balance exists for the procedure. In some implementations, the payment module 157 can compare the user's payable amount and the amount paid by the payer to the actual cost on the invoice from the provider. If a balance remains, in 342, payment of the remaining balance is processed, and the dashboard is updated. In some implementations, if a balance remains, the payment module 157 can process payment for the balance due. Then, in 344, a payment receipt form is generated and posted for the provider. In some embodiments, the payment module 157 can pass the electronic receipt form to the provider interface 168 for posting to the provider.

If a refund exists, in 346, the refund is processed, and the dashboard is updated.

By utilizing centralized electronic communication coordination, the Eligible Pay system 102 facilitates payment resolution and collections in which the user 104 is included in the process. Moreover, because the Eligible Pay system operates as the hub between the provider, payer, and the user 104, the Eligible Pay system provides a one-stop solution for the user 104, e.g., patients where the patients can track all their healthcare treatment. Additionally, the Eligible Pay system 102 provides a new flow of electronic communications between the user, provider, and payer. For example, the Eligible Pay system 102 process the user's portion of the cost so that user almost never receives a bill. Also, by the new flow, the provider doesn't have to bill the user 104 later and can have an assurance that payment will be received. Moreover, by centralizing the network communication between the user 104, the provider, and the payer, the Eligible Pay system reduces the amount of network communication and traffic that must be exchanged between the user 104, the provider, and the payer. Additionally, by centralizing the network communication between the user 104, the Eligible Pay system 102 allows the user 104 to be apprised of the status of the payment resolution, in real-time.

Figure 6:
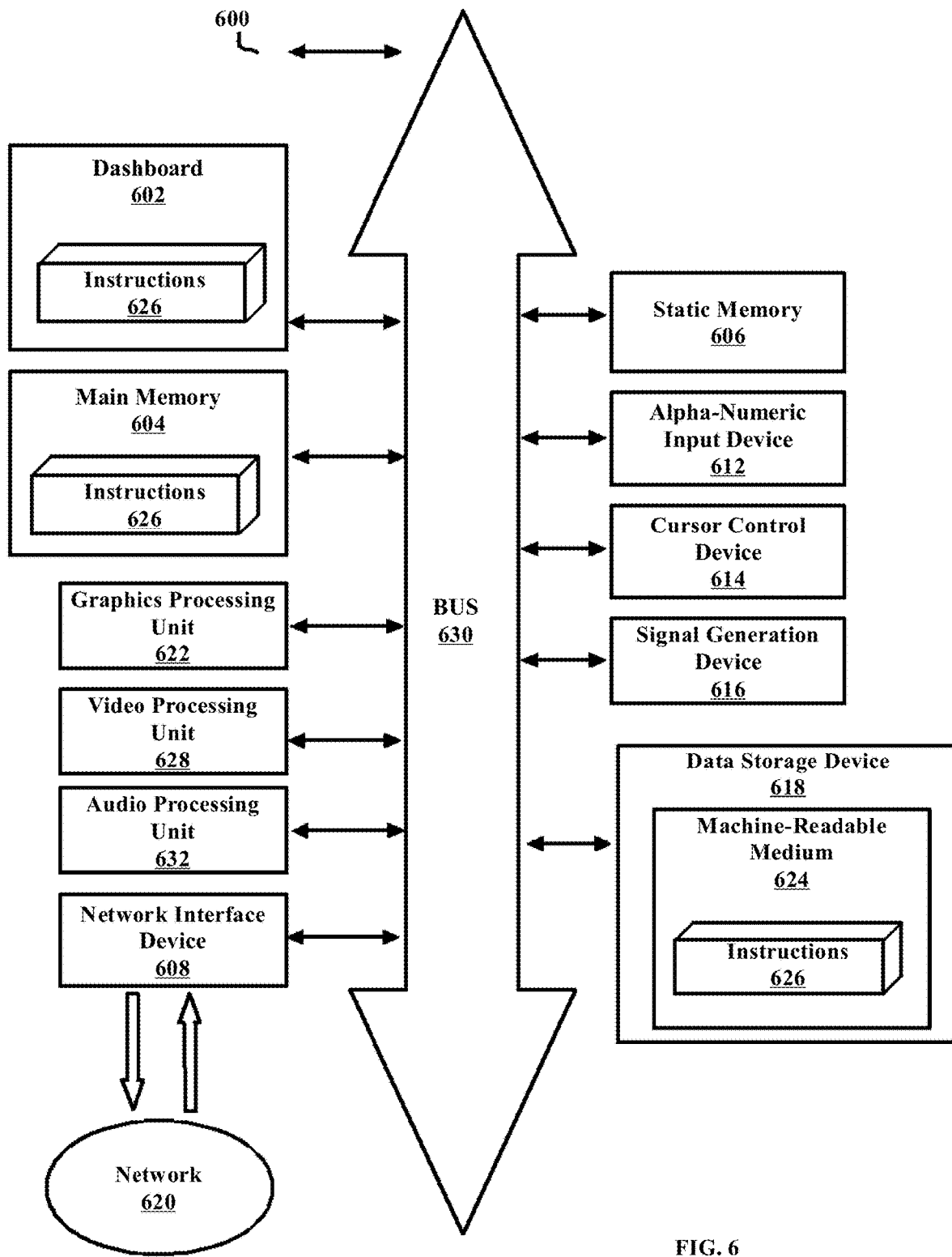
FIG. 6 illustrates an example of a computer system, according to various implementations.

FIG. 6 illustrates an example machine of a computer system within which a set of instructions, for causing the machine to perform any one or more of the methodologies discussed herein, can be executed. In implementations, the machine can be connected (e.g., networked) to other machines in a LAN, an intranet, an extranet, and/or the Internet. The machine can operate in the capacity of a server or a client machine in the client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" also includes any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

The processing device 602 represents one or more general-purpose processing devices such as a microprocessor, a central processing unit, or the like. For example, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 further includes a network interface device 608 to communicate over the network 620. The computer system 600 also includes a video display unit 610 (e.g., a liquid crystal display (LCD) or a cathode ray tube (CRT)), an alphanumeric input device 612 (e.g., a keyboard), a cursor control device 615 (e.g., a mouse), a graphics processing unit 622, a signal generation device 616 (e.g., a speaker), graphics processing unit 622, video processing unit 628, and audio processing unit 632.

The data storage device 618 can include a machine-readable storage medium 624 (also known as a computer-readable medium) on which is stored one or more sets of instructions or software 626 embodying any one or more of the methodologies or functions described herein. The instructions 626 can also reside, completely or at least partially, within the main memory 604 and/or within the processing device 602 during execution thereof by the computer system 700, the main memory 604 and the processing device 602 also constituting machine-readable storage media.

In implementations, the instructions 626 include instructions to implement functionality corresponding to the components of a device to perform the disclosure herein. While the machine-readable storage medium 624 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium"

also includes, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "calculating" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The present disclosure also relates to an apparatus for performing the operations herein. This apparatus can be specially constructed for the intended purposes, or it may comprise a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, flash memory devices, or any type of media suitable for storing electronic instructions, each coupled to a computer system bus. Examples of implementations of the present disclosure can also be provided as a computer program product, or software, that may include a machine-readable medium having stored thereon instructions, which can be used to program a computer system (or other electronic devices) to perform a process according to the present disclosure.

Various general-purpose systems can be used with programs in accordance with the teachings herein, or a more specialized apparatus can be utilized to perform the method. Examples of the structure for a variety of systems appear in the description above. In addition, the present disclosure is not described with reference to any particular programming language. It will be appreciated that a variety of programming languages may be used to implement the teachings of the disclosure as described herein.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps may be eliminated, from the described flows, and other components can be added to, or removed from, the described systems. Accordingly, other embodiments are within the scope of the following claims.

What is claimed is:

1. A method for generating a graphical user interface for establishing multiparty electronic communication, the method comprising:

generating, for interaction with a user, a dashboard for electronic resolution of a claim for a payer portion of a cost of an item provided by a provider, the dashboard comprising a dashboard interface in communication with a database interface, the database interface configured to access a database comprising: user data, transaction data, payer data and provider data, wherein the user data comprises relationship data of the user with the provider and the payer, wherein the provider data comprises item data provided by the provider, item data comprising provider fees for providing the item, wherein payer data comprises rules by the payer relating to compensation for the item, wherein transaction data comprises items purchased from the provider by the user, wherein the database interface is configured to transform the stored data in one or more of the user data, provider data, payer data and transaction data into a uniform format;

generating a provider interface network location and a provider network communication link configured to receive provider data from a computer system of the provider;

generating a payer interface network location and a payer network communication link configured to receive payer data from a computer system of the payer;

generating an activation link to the dashboard embeddable in a third-party website, wherein when the activation link is activated by the user of the third-party website, generating the dashboard comprises generating the dashboard corresponding to the activation link activated through the third-party website;

calculating, in response to a selection in the dashboard, an estimated user portion of the cost of the item, based on the transformed stored data of the user data, provider data, payer data and the transaction data;

establishing a network interface for network communication between a provider of the item and the payer;

coordinating, via the network interface, resolution of the payer portion of the cost of the item;

updating, in real-time, the dashboard with a status of the resolution of the payer portion of the cost; and displaying the dashboard to the user.

2. The method of claim 1, wherein the dashboard is generated in response to a selection of a network link embedded in a third-party website.

3. The method of claim 1, wherein calculating the estimated user portion of the cost of the item, comprises:
applying first attributes associated with the item and second attributes associated with the user to a plurality of statistical models, the statistical models including a price model, a network model, a pre-authorization model, a risk assessment model, and a provider model; and
estimating, based on the application of the plurality of the statistical models, the estimated user portion of the cost of the item.

4. The method of claim 1, wherein establishing the network interface for network communication, comprises:
generating a first network location for posting electronic documents associated with the provider; and
generating a second network location for posting electronic documents associated with the payer.

5. The method of claim 4, wherein the first network location comprises a first uniform resource locator unique to the provider and the second network location comprises a second uniform resource locator unique to the payer.

6. The method of claim 4, wherein coordinating the resolution of the payer portion of the cost of the item, comprises:
generating an electronic payment receipt form comprising an indication of payment of the estimated user portion of the cost of the item;
posting the electronic payment receipt form to the first network location;
receiving, from the provider via the first network location, an electronic invoice for an actual cost of the item; and
updating, in real-time, the dashboard with details of the electronic invoice.

7. The method of claim 6, wherein coordinating the resolution of the payer portion of the cost of the item, further comprises:
generating an electronic claim form based on the electronic invoice received and attributes associated with the user;
posting the electronic claim form to the second network location;
receiving, from the payer via the second network location, an electronic adjudication form indicating the resolution of the payer portion of the cost of the item; and
updating, in real-time, the dashboard with details the resolution of the payer portion of the cost of the item.

8. The method of claim 7, the method further comprising:
determining a difference between the actual cost of the item and a sum of the payer portion of the cost and the estimated user portion of the cost;
coordinating a settlement of the difference between the actual cost of the item and the sum of the payer portion of the cost and the estimated user portion of the cost; and
updating, in real-time, the dashboard with details of the settlement.

9. The method of claim 1, the method further comprising:
processing electronic payment of the estimated user portion of the cost of the item; and
updating, in real-time, the dashboard with details of the electronic payment.

10. A non-transitory computer-readable medium storing instructions for causing one or more processors to perform a method for generating a graphical user interface for establishing multiparty electronic communication, the method comprising:
generating, for interaction with a user, a dashboard for electronic resolution of a claim for a payer portion of a cost of an item provided by a provider, the dashboard comprising a dashboard interface in communication with a database interface, the database interface configured to access a database comprising: user data, transaction data, payer data and provider data,
wherein the user data comprises relationship data of the user with the provider and the payer,
wherein the provider data comprises item data provided by the provider, item data comprising provider fees for providing the item,
wherein payer data comprises rules by the payer relating to compensation for the item,
wherein transaction data comprises items purchased from the provider by the user,
wherein the database interface is configured to transform the stored data in one or more of the user data, provider data, payer data and transaction data into a uniform format;
generating a provider interface network location and a provider network communication link configured to receive provider data from a computer system of the provider;
generating a payer interface network location and a payer network communication link configured to receive payer data from a computer system of the payer;
generating an activation link to the dashboard embeddable in a third-party website, wherein when the activation link is activated by the user of the third-party website, generating the dashboard comprises generating the dashboard corresponding to the activation link activated through the third-party website;
calculating, in response to a selection in the dashboard, an estimated user portion of the cost of the item, based on the transformed stored data of the user data, provider data, payer data and the transaction data;
establishing a network interface for network communication between a provider of the item and the payer;
coordinating, via the network interface, resolution of the payer portion of the cost of the item;
updating, in real-time, the dashboard with a status of the resolution of the payer portion of the cost; and
displaying the dashboard to the user.

11. The non-transitory computer-readable medium of claim 10, wherein the dashboard is generated in response to a selection of a network link embedded in a third-party web site.

12. The non-transitory computer-readable medium of claim 10, wherein calculating the estimated user portion of the cost of the item, comprises:
applying first attributes associated the item and second attributes associated with the user to a plurality of statistical models, the statistical models including a price model, a network model, a pre-authorization model, a risk assessment model, and a provider model; and
estimating, based on the application of the plurality of the statistical models, the estimated user portion of the cost of the item.

13. The non-transitory computer-readable medium of claim 10, wherein establishing the network interface for network communication, comprises:

generating a first network location for posting electronic documents associated with the provider; and generating a second network location for posting electronic documents associated with the payer.

14. The non-transitory computer-readable medium of claim 13, wherein the first network location comprises a first uniform resource locator unique to the provider and the second network location comprises a second uniform resource locator unique to the payer.

15. The non-transitory computer-readable medium of claim 13, wherein coordinating the resolution of the payer portion of the cost of the item, comprises:

generating an electronic payment receipt form comprising an indication of payment of the estimated user portion of the cost of the item;

posting the electronic payment receipt form to the first network location;

receiving, from the provider via the first network location, an electronic invoice for an actual cost of the item; and updating, in real-time, the dashboard with details of the electronic invoice.

16. The non-transitory computer-readable medium of claim 15, wherein coordinating the resolution of the payer portion of the cost of the item, further comprises:

generating an electronic claim form based on the electronic invoice received and attributes associated with the user;

posting the electronic claim form to the second network location;

receiving, from the payer via the second network location, an electronic adjudication form indicating the resolution of the payer portion of the cost of the item; and updating, in real-time, the dashboard with details the resolution of the payer portion of the cost of the item.

17. The non-transitory computer-readable medium of claim 16, the method further comprising:

determining a difference between the actual cost of the item and a sum of the payer portion of the cost and the estimated user portion of the cost;

coordinating a settlement of the difference between the actual cost of the item and the sum of the payer portion of the cost and the estimated user portion of the cost; and updating, in real-time, the dashboard with details of the settlement.

18. The non-transitory computer-readable medium of claim 10, the method further comprising:

processing electronic payment of the estimated user portion of the cost of the item; and updating, in real-time, the dashboard with details of the electronic payment.

19. A method for generating a graphical user interface for establishing multiparty electronic communication, the method comprising:

generating, for interaction with a user, a dashboard for electronic resolution of a claim for a payer portion of a cost of an item;

generating an activation link to the dashboard embeddable in a third-party website, wherein when the activation link is activated by a user of the third-party web site, generating the dashboard comprises generating the dashboard corresponding to the activation link activated through the third-party website;

receiving, via a first dedicated input embedded in the dashboard, a first selection to calculate an estimated user portion of the cost of the item;

receiving, via a second dedicated input embedded in the dashboard, a second selection to process payment of the estimated user portion of the cost of the item and initiate resolution of the claim for the payer portion of the cost of the item;

transmitting, to a server via a network, an electronic communication requesting the server to coordinate resolution of the payer portion of the cost of the item, wherein the server establishes a network interface for network communication between a provider of the item and the payer;

receiving, in real-time, status updates indicating a status of the resolution of the payer portion of the cost of the item;

updating, in real-time, the dashboard with the status of the resolution of the payer portion of the cost; and displaying the dashboard.

20. The method of claim 19, wherein the dashboard is generated in response to a selection of a network link embedded in a third-party website.

* * * * *